United States Patent  [11] 3,602,018

[72] Inventor Arnold Eisenman
 18636 Cherrylawn, Detroit, Mich. 48221
[21] Appl. No. 840,557
[22] Filed Mar. 7, 1969
[45] Patented Aug. 31, 1971
 Division of Ser. No. 616,522, Feb. 6, 1967,
 Patent No. 3,431,755

[54] MOTOR VEHICLE LOCK
 3 Claims, 3 Drawing Figs.
[52] U.S. Cl. ................................................. 70/202,
 70/247
[51] Int. Cl. ........................................ G05g 5/06,
 B60r 25/06
[50] Field of Search ........................................ 70/202,
 201, 206, 192, 193, 194, 195, 247, 248

[56] References Cited
 UNITED STATES PATENTS
1,349,973 8/1920 Mather ........................ 70/202 X
1,369,308 2/1921 Taylor ......................... 70/202 X
2,156,355 5/1939 Sandberg ..................... 70/193
2,679,744 6/1954 Hildebrand .................. 70/202

FOREIGN PATENTS
1,248,320 10/1960 France ........................ 70/192

Primary Examiner—Albert G. Craig, Jr.
Attorney—Hauke, Gifford & Patalidis

ABSTRACT: A locking mechanism for preventing the control or shift lever of a motor vehicle from being manually displaced from a latched position to an unlatched position permitting the lever to shift the transmission by angular displacement to predetermined positions. A restraining member is engaged with a portion of the lever or with the unlatching means to hold the lever in a latched position when a lock, to which the restraining member is operatively connected, is locked. When the lock is unlocked the restraining member is disengaged from the lever or from the latching means and permits the lever to be unlatched.

PATENTED AUG 31 1971 3,602,018

INVENTOR
ARNOLD EISENMAN
By Hauke, Kraus, Gifford, & Patalidis
ATTORNEYS

MOTOR VEHICLE LOCK

CROSS REFERENCE TO RELATED APPLICATIONS

This application is a division of application Ser. No. 616,522, filed Feb. 6, 1967, now U.S. Pat. No. 3,431,755, dated Mar. 11, 1969, and is related to application Ser. No. 711,424, filed Mar. 7, 1968, and now U.S. Pat. No. 3,508,424, dated Apr. 28, 1970.

BACKGROUND OF THE INVENTION

The present invention relates to transmission locks for motor vehicles, and more particularly to a locking mechanism which, when locked, prevents the transmission control lever from being displaced, to a position permitting the motor vehicle to be driven. In its preferred form, the present invention provides a motor vehicle having a so-called "automatic" transmission with a locking mechanism which, when locked, holds the transmission control lever in the "park" position, such that the motor vehicle is positively immobilized. The lock cooperating with the locking mechanism of the invention must be unlocked by a person having an appropriate key corresponding to the code combination of the lock, prior to freeing the control lever for subsequent displacement to anyone of its drive range positions.

In one of its aspects, the present invention is particularly adapted to motor vehicle automatic transmissions wherein the control lever is mounted on the steering column of the vehicle and is angularly positionable along a quadrant to various driving mode positions such as, reverse, neutral, drive, low, or the like, from a nondriving "park" position. In such transmission control lever arrangements, there are means provided for latching the control or shift lever at each of its driving positions, such latching means requiring the lever to be angularly displaced towards the driver and about a first fulcrum point against a spring bias in order to unlatch the lever prior to angularly displacing the lever about a second fulcrum having its axis substantially normal to the axis of the lever latching fulcrum. The locking mechanism of the invention provides for a wedging member engaging a portion of the lever and preventing the unlatching motion thereof.

Motor vehicles presently available are so designed that their imperviousness to theft or to being driven without the owner's permission leaves much to be desired. The only antitheft devices provided as "original equipment" are the door locks and the lock for the ignition switch, which is usually combined with the starter motor relay switch, such that, when the ignition lock is unlocked by means of an appropriate key, the motor vehicle engine may be started. The same key often fits the door locks and the ignition lock, although, in some makes of motor vehicles different keys must be used for the door locks and for the ignition lock. As a result of providing such vulnerable antitheft devices for motor vehicles, motor vehicles may be easily started and the unauthorized use and driving away of motor vehicles can be easily effected by way of a jumper wire connected to the appropriate terminals of a locked ignition switch so as to short circuit the normally open switch contacts of the ignition switch when the switch is locked. The present invention provides an antitheft device which, although it may be combined with the lock for the ignition switch if so desired, provides additional positive safeguards against unauthorized use of a motor vehicle by positively holding the motor vehicle transmission control lever in a nondriving position, preferably in the "park" position wherein, as is well known, the propeller shaft of the motor vehicle is positively immobilized by means such as a pawl or a dog locking the shaft against rotation.

Transmission control lever locking mechanisms have been known in the past as disclosed, for example, in U.S. Pat. Nos. 1,622,839, 1,622,099, 1,681,017, 1,769,137, 1,863,742, 1,903,017, and 2,046,379, among others. However, such devices are often complex and they require important structural modification to be incorporated in the transmission mechanism; they are difficult to adapt to already existing vehicles, and they are expensive to manufacture and prohibitive in cost. By contrast, the present invention provides motor vehicle transmission locking mechanisms that include few parts, which may be manufactured at low cost, which require little or no modification to existing motor vehicles, which may be designed for and incorporated into motor vehicles during manufacture with particularly no modification of existing transmissions, and which may be mounted on already existing motor vehicles.

Objects and advantages of the present invention will become more clearly apparent when the description of a few examples of preferred embodiments thereof is considered in conjunction with the accompanying drawings wherein:

DESCRIPTION OF THE PREFERRED EMBODIMENT

Figure 1:
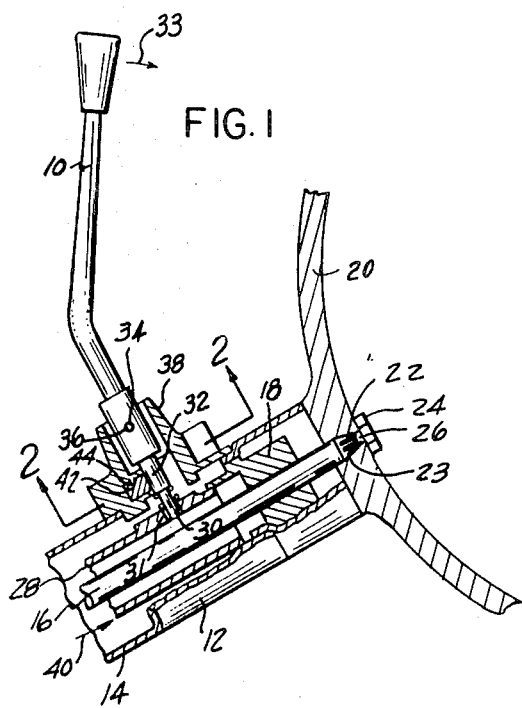
FIG. 1 is a partial longitudinal sectional view showing in a schematic manner an example of an embodiment of a motor vehicle transmission control lever locking mechanism according to the present invention.
Figure 2:
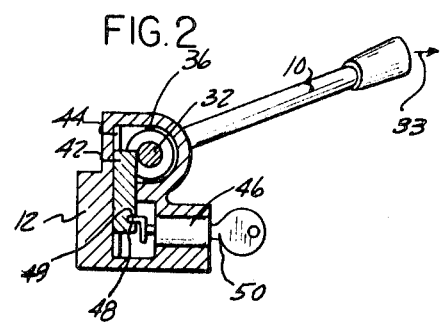
FIG. 2 is a sectional view substantially along line 2—2 of FIG. 1, with the locking mechanism locked.

An example of conventional motor vehicle transmission control lever mechanisms, as shown in FIGS. 1 and 2, generally includes a control or shifting lever 10 supported in an annular housing 12 mounted on the steering column jacket 14 of the motor vehicle. Annular housing 12 has a limited range rotation capability with respect to the steering column jacket 14 around a first axis coinciding with the steering column axis. Within the steering column jacket is disposed, in the usual manner, a steering column shaft 16 capable of journaling in bearing block 18 under the action of steering wheel 20, mounted on the end thereof by means of, for example, tapered splined end 22 on the end of shaft 16 engaging a correspondingly tapered and splined bore 23 in the hub of the steering wheel. A nut 24 cooperating with reduced diameter threaded end portion 26 of the steering shaft 16 holds the steering wheel on the end of the shaft 16.

The motor vehicle transmission, not shown, may be shifted to any one of different driving modes, such as reverse, neutral, forward drive, slow and low, for example, by means of a shifting sleeve 28 disposed around steering shaft 16 within steering column jacket 14 and rotatable relatively thereto within a limited angular range, in coordination with annular housing 12 being rotated relatively to the steering column jacket 14 by means of lever 10 whose reduced diameter end 30 engages a peripheral aperture 31 in the sleeve 28. The steering column jacket 14 may include a quadrant ratchet arrangement, not shown, engageable by the end 32 of the lever 10, end 32 being urged at all times by means of a spring bias for engagement with a slot of the rachet quadrant such that annular housing 12 is normally immobilized in predetermined angular positions. The ratchet arrangement is such that lever 10 must be first angularly displaced in the direction of arrow 33 in order to disengage its end 32 from a ratchet quadrant notch for the purpose of unlatching annular housing 12 for subsequent angular positioning of annular housing 12 and corresponding rotation of shifting sleeve 28 to the selected driving range position of the transmission. To permit such an unlatching motion, lever 10 is capable of angular displacement around fulcrum pivot 34 defined by a pin 36, or the like, passing through an appropriate transverse aperture in the lever and pivotally holding the lever with respect to a boss 38 disposed in annular housing 12 and surround the lever where it projects through the annular housing 12 with the end 32 of the lever disposed toward the interior thereof.

Alternately, as shown more clearly in FIG. 1, shifting sleeve 28 is biased normally in the direction of arrow 40 and must first be longitudinally displaced against such bias by the action of reduced diameter end portion 30 of lever 10 engaging aperture 31 in the sleeve 28 so as to unlatch sleeve 28 for subsequent rotation by means of lever 10.

Figure 3:
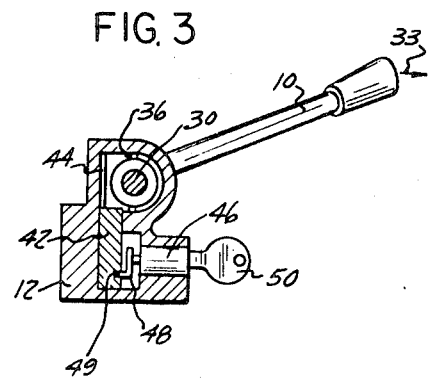
FIG. 3 is a view similar to FIG. 2, but showing the locking mechanism unlocked.

As shown in FIGS. 1-2, the present invention, in one of its aspects, provides a wedging member or block 42 slidably disposed in a keyway or slot 44 in annular housing 12, wedging member 42 being normally adapted to engage the peripheral surface of end portion 32 of lever 10, such as to normally prevent the unlatching angular motion of lever 10 in the direction of arrow 33, for preventing the motor vehicle transmission from being shifted to any one of the driving range positions. Wedging member 42 is held in the locking position of FIG. 2 by means of a lock such as cylinder lock 46 having a plug, not seen, on the end of which is mounted an eccentric member 48 engaging an appropriate recess 49 in the wedging member 42. When lock 46 is unlocked by means of a key such as key 50 and the plug of the lock is rotated relatively to the housing thereof by rotation of key 50, eccentric member 48 causes wedging member 42 to be displaced to the position shown in FIG. 3, thus no longer engaging end 32 of lever 10 and freeing the lever such that it can be displaced in the direction of arrow 33 for unlatching the transmission control and permitting housing 12 to be rotated together with shifting sleeve 28 to any appropriate driving range position.

The lock element included in the combination of elements of the present invention may be any type of conventional lock and may be arranged, if so desired, to actuate the motor vehicle ignition switch, although it is evident that providing different locks for the transmission locking mechanism and for the ignition switch considerably increases the task of a would-be thief. It is obvious that, although the invention has been described and illustrated in applications to motor vehicles provided with so-called automatic transmission, the same principles and the same structures are adaptable to motor vehicles equipped with nonautomatic transmissions.

It is apparent that the preferred embodiments of the invention herein disclosed have been given for illustrative purpose only, and it would be appreciated by those skilled in the art that the invention is susceptible of many modifications, variations and changes, without departing from the scope of the appended claims.

What is claimed as novel is:

1. In a motor vehicle having a steering column and a transmission control lever mounted on an annular housing on said steering column and having an end portion projecting into said annular housing wherein said lever is adapted to be first set to an unlatched state by angular displacement to a first angular position relatively to a fulcrum axis with respect to said annular housing for release of said lever prior to shifting said transmission by displacement of said lever and said annular housing to various angular positions relatively to said steering column, a locking mechanism for said lever comprising:

a lock element in said annular housing;
a sliding member within said annular housing and wedgedly engageable with a peripheral portion of the end portion of said lever; and
actuating means operatively connected to said sliding member and operable by said lock element for displacing said sliding member from an engaged position with said peripheral portion to a released position;
said sliding member being disposed within said annular housing for prevent angular displacement of said lever about said fulcrum axis to said unlatched state.

2. The locking mechanism of claim 1 wherein said actuating means comprises:

a recess in said sliding member; and
an operating member rotatable by said lock element and having a projecting eccentric portion engaged in said recess.

3. The locking mechanism of claim 1 wherein said sliding member is engageable with said lever only when said lever is in a "park" position.

EDA-100-A-2

UNITED STATES PATENT OFFICE
CERTIFICATE OF CORRECTION

Patent No. 3,602,018      Dated August 31, 1971

Inventor(s) Arnold Eisenman

It is certified that error appears in the above-identified patent and that said Letters Patent are hereby corrected as shown below:

IN THE SPECIFICATION

Column 1, line 72, change "1,622,099" to - - 1,662,099 - -

Column 2, line 8, change "particularly" to - - practically - -

Column 2, line 57, correct the spelling of "ratchet"

Column 2, line 71, change "surround" to - - surrounding - -

IN THE CLAIMS

Column 4, line 13, before "said" insert - - of - -

Column 4, line 26, change "prevent" to - - preventing - -

Signed and sealed this 29th day of February 1972.

(SEAL)
Attest:

EDWARD M. FLETCHER, JR.      ROBERT GOTTSCHALK
Attesting Officer             Commissioner of Patents